(12) United States Patent
Lubbers et al.

(10) Patent No.: US 8,086,820 B2
(45) Date of Patent: Dec. 27, 2011

(54) DATA STRUCTURE FOR HIGHLY EFFICIENT DATA QUERIES

(75) Inventors: Clark Edward Lubbers, Colorado Springs, CO (US); Randy L. Roberson, Spring Hill, FL (US)

(73) Assignee: Seagate Technology LLC, Cupertino, CA (US)

( * ) Notice: Subject to any disclaimer, the term of this patent is extended or adjusted under 35 U.S.C. 154(b) by 863 days.

(21) Appl. No.: 11/771,881

(22) Filed: Jun. 29, 2007

(65) Prior Publication Data

US 2009/0006740 A1     Jan. 1, 2009

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. .................. 711/200; 711/118; 711/131

(58) Field of Classification Search .................. 711/131, 711/200–221
See application file for complete search history.

(56) References Cited

U.S. PATENT DOCUMENTS

| | | | | |
|---|---|---|---|---|
| 5,664,179 A | * | 9/1997 | Tucker | 1/1 |
| 5,671,406 A | * | 9/1997 | Lubbers et al. | 1/1 |
| 5,761,501 A | * | 6/1998 | Lubbers et al. | 1/1 |
| 7,031,320 B2 | | 4/2006 | Choe | |
| 2002/0118682 A1 | * | 8/2002 | Choe | 370/395.31 |
| 2003/0079102 A1 | * | 4/2003 | Lubbers et al. | 711/202 |
| 2003/0196024 A1 | * | 10/2003 | Frank | 711/3 |
| 2005/0055529 A1 | * | 3/2005 | Lubbers et al. | 711/203 |
| 2005/0203974 A1 | * | 9/2005 | Smith et al. | 707/204 |
| 2006/0112151 A1 | * | 5/2006 | Manley et al. | 707/201 |
| 2006/0294118 A1 | * | 12/2006 | Lubbers et al. | 707/100 |
| 2007/0136385 A1 | * | 6/2007 | Abrashkevich et al. | 707/200 |

OTHER PUBLICATIONS

A Skip List Cookbook; Pugh, William; Jun. 1990.*
Algorithms in Java, 3rd Edition; Sedgewick, Robert; Jan. 2004; p. 588.*
Algorithms in Java, 3rd Edition; Sedgewick, Robert; Jan. 2004; p. 599.*
Chapter Twelve Calculation Via Table Lookups; Art of Assembly; Apr. 27, 2004.*
Subject Matter Eligibility Test (M-OR-T) for Process Claims; USPTO.*
Subject Matter Eligibility Test; USPTO.*

* cited by examiner

*Primary Examiner* — Yaima Campos
(74) *Attorney, Agent, or Firm* — Mitchell K. McCarthy

(57) ABSTRACT

Apparatus and method for highly efficient data queries. In accordance with various embodiments, a data structure is provided in a memory space with a first portion characterized as a virtual data space storing non-sequential entries and a second portion characterized as a first data array of sequential entries. At least a first sequential entry of the data array points to a skip list, at least a second sequential entry of the data array points to a second data array, and at least a third sequential entry points to a selected non-sequential entry in the first portion.

14 Claims, 4 Drawing Sheets

DATA STRUCTURE FOR HIGHLY EFFICIENT DATA QUERIES

BACKGROUND

Data storage devices are used in a variety of applications to store and retrieve user data. The data are often stored to internal storage media, such as one or more rotatable discs accessed by an array of data transducers that are moved to different radii of the media to carry out I/O operations with tracks defined thereon.

Storage devices can be grouped into storage arrays to provide consolidated physical memory storage spaces to support redundancy, scalability and enhanced data throughput rates. Such arrays are often accessed by controllers, which in turn can communicate with host devices over a fabric such as a local area network (LAN), the Internet, etc. A virtual storage space can be formed from a number of devices to present a single virtual logical unit number (LUN) to the network.

SUMMARY

Various embodiments of the present invention are generally directed to an apparatus and method for highly efficient data queries.

In accordance with various embodiments, a data structure is provided in a memory space with a first portion characterized as a virtual data space storing non-sequential entries and a second portion characterized as a first data array of sequential entries. At least a first sequential entry of the data array points to a skip list, at least a second sequential entry of the data array points to a second data array, and at least a third sequential entry points to a selected non-sequential entry in the first portion.

DETAILED DESCRIPTION

Figure 1:
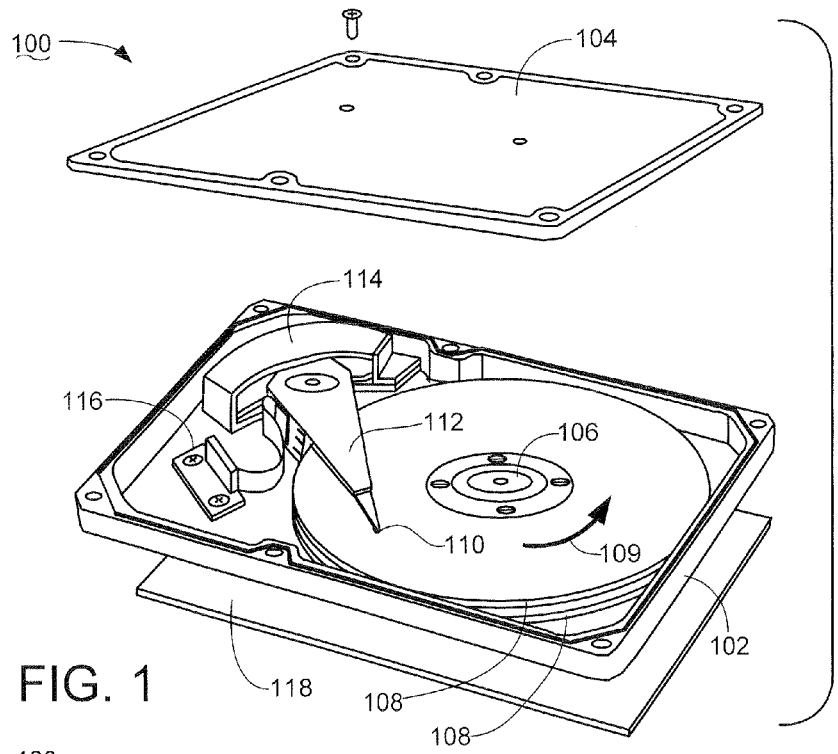
FIG. 1 shows an exemplary data storage device.

FIG. 1 shows an exemplary data storage device in accordance with various embodiments of the present invention. The device is characterized as a hard disc drive of the type configured to store and transfer user data with a host device, although such is not limiting.

The device 100 includes a housing formed from a base deck 102 and top cover 104. A spindle motor 106 rotates a number of storage media 108 in rotational direction 109. The media 108 are accessed by a corresponding array of data transducers (heads) 110 disposed adjacent the media to form a head-disc interface (HDI).

A head-stack assembly ("HSA" or "actuator") is shown at 112. The actuator 112 rotates through application of current to a voice coil motor (VCM) 114. The VCM 114 aligns the transducers 110 with tracks (not shown) defined on the media surfaces to store data thereto or retrieve data therefrom. A flex circuit assembly 116 provides electrical communication paths between the actuator 112 and device control electronics on an externally disposed printed circuit board (PCB) 118.

Figure 2:
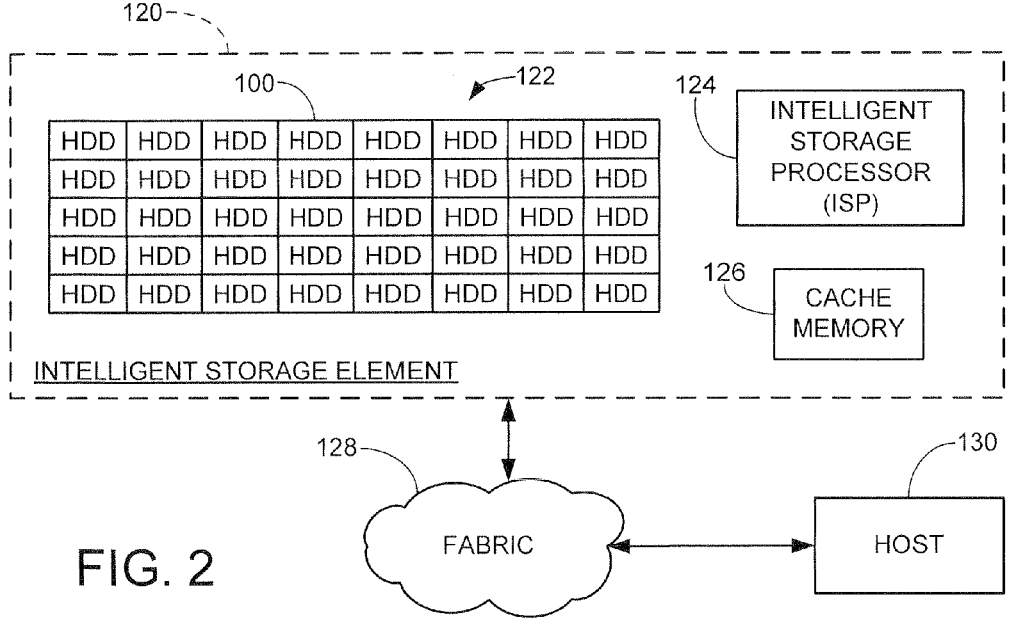
FIG. 2 depicts a network system that incorporates the device of FIG. 1.

In some embodiments, the device 100 is incorporated into a multi-device intelligent storage element (ISE) 120, as shown in FIG. 2. The ISE 120 comprises a plurality of such devices 100 arranged into a data storage array 122. The ISE 120 further comprises at least one programmable intelligent storage processor (ISP) 124, and associated cache memory 126. The array 122 forms a large combined memory space across which data are striped, such as in a selected RAID (redundant array of independent disks) configuration. The ISP 124 operates as an array controller to direct the transfer of data to and from the array.

The ISE 120 communicates across a computer network, or fabric 128 to any number of host devices, such as exemplary host device 130. The fabric can take any suitable form, including the Internet, a local area network (LAN), etc. The host device 130 can be an individual personal computer (PC), a remote file server, etc. One or more ISEs 120 can be combined to form a virtual storage space, as desired.

In a preferred embodiment, the devices 100 in the ISE 120 of FIG. 2 are each characterized as having around 4 terabytes, TB ($4 \times 10^{12}$ bytes) of capacity. A total of 128 such devices are contemplated, for a total capacity of about 512 TB. Each device 100 is divided into ⅛th capacity segments to form books. With 128 devices, a total of 128 such books can be provided with 0% sparing. The books are divided into 16 MB sets of data referred to as Reliable Storage Units (RSUs).

The RSUs in each book are identified via individual row numbers. A Reliable Storage Unit Descriptor (RSUD) accordingly provides an efficient way to describe each RSU within the array. An exemplary format for a 32-bit (4-byte) RSUD is set forth by Table 1:

TABLE 1

| No. of Bits | Description | Comments |
| --- | --- | --- |
| 3 | Device Organization | Up to eight (8) different device organizations |
| 7 | Book ID | Up to 128 books |
| 1 | D-Bit | 1 => DIF invalid flag |
| 3 | RAID Level | Up to 8 RAID organizations |
| 18 | Row ID | Covers 512 GB at 16 MB grains |

The data capacity within the array 122 is preferably arranged into up to 64 original logical unit numbers (LUNs). Up to three snapshot LUNs are provided per original LUN to store snapshot, or "prior version," data. This provides a total of up to 256 LUNs within the ISE 120. The snapshot LUNs are preferably arranged as snapshot data containers (SDCs).

As will be appreciated, snapshot data generally comprises data that are copied to retain a previous version of the data prior to a subsequent altering of that data during normal system usage. Any number of snapshot schemes can be employed, such as snapshots taken on a regular timed basis, or on an event driven basis (such as, for example, prior to a new write operation or deletion operation upon existing data). It is therefore desirable to efficiently ascertain the snapshot status of the data stored in the array.

One decision that faces system designers in implementing a storage system is selecting the size of the "copy grain," or increment size (boundaries) at which data are copied in a snapshot operation. A relatively smaller copy grain, such as (but not limited to) 128K, can be advantageous under certain circumstances, such as RAID-1 implementations and when the system is subjected to highly random loads. This is because, generally, less data need be copied each time a host accesses the storage system.

However, using a smaller copy grain can significantly increase the processing overhead required to track the snapshot status, including the need for additional status bits (e.g., Reference Bits, Zero Bits, etc.) to denote the status of individual copy grains, particularly with the use of a larger stripe size such as 2 MB. Moreover, some higher RAID levels, such as RAID-5 and RAID-6, are generally formatted to use larger copy grains of 512 KB.

Data storage capacity can also be inefficiently used when processing snapshot copies for certain types of loads. Random I/O loads of relatively large transfers (e.g., 64 KB to 128 KB) with wide dispersion, and small transfers with small clusters (e.g., 64 KB to 128 KB), can be efficiently processed using a uniform copy grain of 512 KB.

Figure 3:
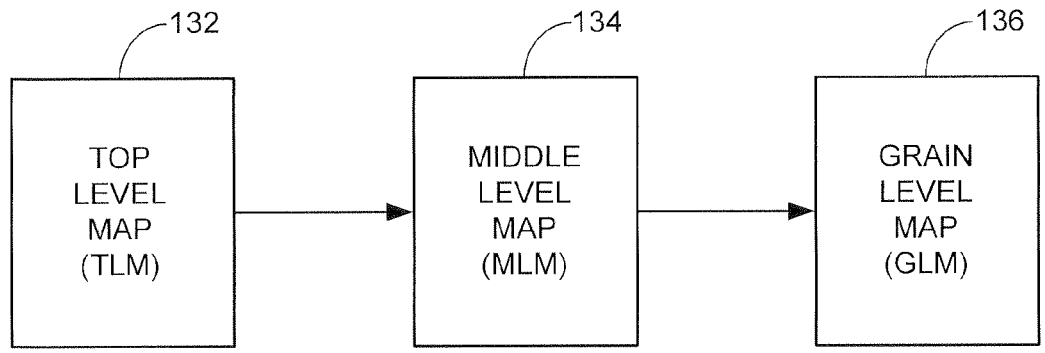
FIG. 3 generally shows a data structure in memory of the system of FIG. 2 including a top level map (TLM), a middle level map (MLM) and a grain level map (GLM).

Nevertheless, many of the allocated grains in such transfers will only have one copy grain occupied out of 128 (for 16 MB). This provides an efficiency rate of less than 1% (1/128<1%) from a memory utilization standpoint. Moreover, the processing of snapshot data requires the random writing of two (RAID-1), five (RAID-5), or six (RAID-6) 128 KB blocks of data for every copy grain Accordingly, a novel data arrangement is provided to facilitate the processing of status information relating to the ISE storage space, such as snapshot information, in a highly efficient manner. This arrangement is shown in FIG. 3 to include a top level map (TLM) 132, a middle level map (MLM) 134, and a grain level map (GLM) 136. While not limiting, it is contemplated that these structures each occupy 2 KB of memory space, allowing for efficient transfer between local memory (e.g., cache memory 126 in FIG. 2) and disc memory (e.g., the media 110 of FIG. 1) as required.

As explained below, the structures 132, 134, and 136 are preferably arranged to enable the system to efficiently process queries with regard to snapshot copies of individual grains. In the exemplary embodiments herein, the snapshot copies are at a smaller grain size of 128 KB, although such is illustrative and not limiting. Generally, the structures 132, 134, 136 are successively accessed in order to determine whether a particular snapshot copy exists for a given set of data; if a match is found within the map structures, a snapshot copy has been made and the system can proceed with its normal processing. If the data are not present, the system can proceed to carry out the requisite allocation and copying operations.

The structures 132, 134 and 136 further preferably operate to accumulate snapshot entries, enabling the writing of the data to take place efficiently once an entire stripe worth of data (e.g., 2 MB) have been accumulated. It is contemplated that the structures are processed by the ISP 124, although other arrangements can be used as desired.

Each of the TLMs 132 is generally characterized as a flat map, or data array, that permits direct data lookup for a range of the virtual space. Preferably, each of the 256 LUNs is provided with a corresponding TLM 132, for a total of 256 TLMs. Each TLM accordingly maps about 2 TB of the overall storage space.

Figure 4:
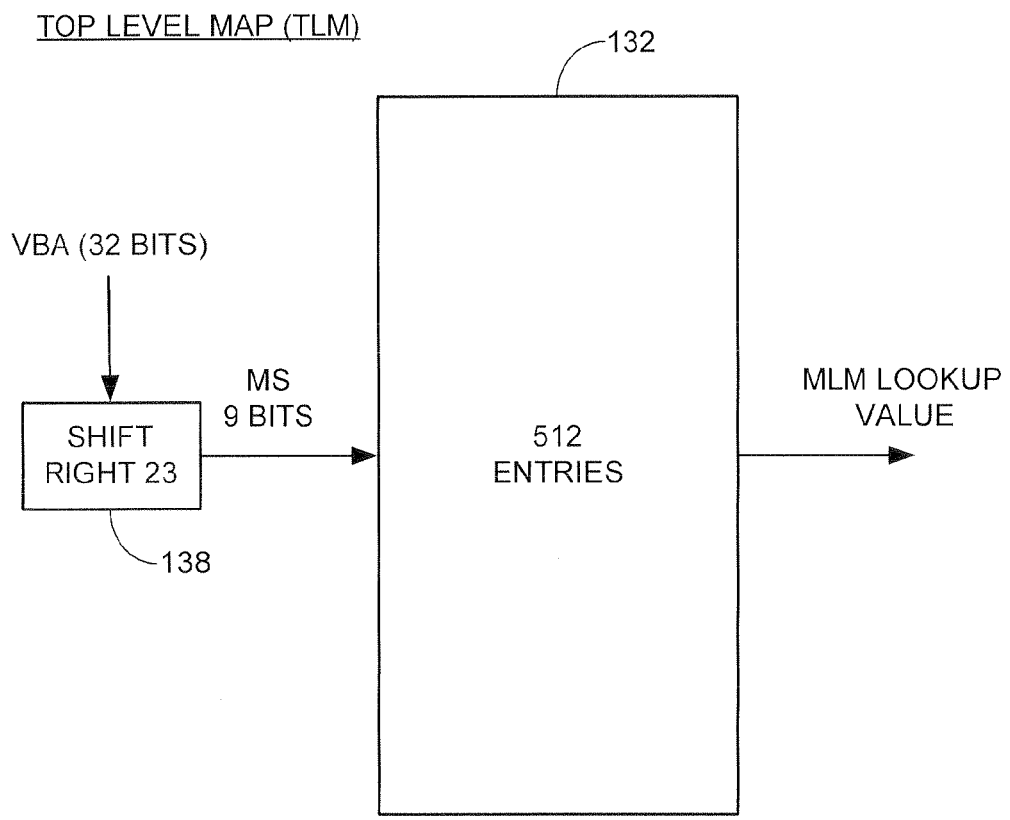
FIG. 4 depicts the TLM of FIG. 3 in greater detail.

As shown in FIG. 4, a particular VBA (virtual block address) value of 32 bits is supplied to the associated TLM 132. In this example, the presentation of the VBA is provided in order to determine whether a snapshot copy has been generated for this particular address. More generally, the operation at this point can be contemplated as comprising a query as to whether any data exists for values within this particular 32-bit range.

The TLM 132 is shown to have a total of 512 entries. A shift block 138 preferably shifts the input 32-bit VBA value right by 23 bits, so that the most significant 9 bits are used to index the TLM. The associated entry out of the 512 ($2^9$) entries produces a so-called "MLM lookup value," which is output to an associated MLM 134. Generally, the MLMs 134 are used to organize the data in the SDCs (snapshot data containers).

Each MLM 134 covers 4 GB of the overall storage space, and includes first and second portions 140, 142. The first portion 140 is characterized as a virtual space and can accommodate up to 256 4-byte RSUDs. These RSUDs will map the occupied portion of the 4 GB grain of the SDC referenced by the TLM 132 in 16 MB grains. The addition of new entries of RSUDs to the first portion 140 will be discussed more fully below, but at this point it will be appreciated that the RSUDs may be in a non-sequential order, since new RSUDs are added in response to I/O operations on the original LUNs, and these may be in response to random loads.

The 4 GB span of the MLM covers a total of 32,768 128 KB grains. The presence of an RSUD entry indicates that at least one, or all, of the grains within the associated 16 MB RSUD span has been copied.

The second portion 142 of the MLM 134 preferably comprises a flat data array with up to 256 entries (pointers). The data array facilitates direct lookup from the lookup value supplied from the TLM 132. Each pointer in the second portion 142 will cover 16 MB and will reference one of three different structures.

Preferably, if a "segmented" flag (0x80000000) in the pointer is set, the entry will point to a particular segmented grain level map (SGLM) 144, arranged as a skip list. If the segmented flag is not set, the entry will point to a particular flat grain level map (FGLM) 146. Accessing these respective structures produces an output that points to a particular RSUD in the first portion 140, and provides offset information to identify which of the 32,768 128 KB grains in the 4 GB space has copied.

Each FGLM 146 is arranged as a flat data array with direct lookup, and covers 128 MB referenced by 8 consecutive entries starting on a 128 MB mapping boundary in the MLM 134. For reference, an SGLM 144 is converted to an FGLM 146 when the utilized capacity of a set of SGLMs 144 reaches a certain threshold with respect to the ranges they cover, such as ¼ full (e.g., 32 MB out of a total 128 MB ligned area). This is based on an observation that generally, at this point a single FGLM may be a more efficient map structure.

Each entry in the second portion 142 of the MLM 134 can alternatively index the first portion 140 of the MLM 134. This occurs if a so-called indirect RSU pointer (IRP) flag 148 (0x40000000) is set. In such a case, the low 8 bits of the MLM entry will index the RSUD array in the MLM 134 to allow locating an RSUD therein. The RSUD will map a copy grain of 16 MB; that is, the IRP flag preferably indicates that all 128 of the 128 KB copy grains of the 16 MB span of the RSUD have been copied.

At this point it will be noted that managing the particular 4 GB grain of a snapshot may be somewhat difficult due to the issue of finding the next free 128 KB grain, such as after a reboot of the system. This is preferably addressed by formatting the first portion 140 of the MLM 134 such that the RSUD array will indicate the last RSU allocated (first all zero entry), and provide a starting offset (as used in the SGLM). However, all GLM structures may need to be scanned to determine the last offset used. With one or more IRP entries, the last RSUD may not have an index in the set of GLMs because it is referenced via an IRP. This can be determined during the scan, however.

The format of the SGLM 144 is a relatively straightforward skip list. As those skilled in the art will appreciate, a skip list is a form of a linked list where each item, or node, in the list has a random number of extra forward pointers. Searching such a list approximates the performance of searching binary trees, while having dramatically lower cost in terms of maintenance as compared to a binary tree.

Generally, a skip list is maintained in an order based on comparisons of a key field within each node. The comparison is arbitrarily selected and may be ascending or descending, numeric or alpha-numeric, and so forth. When a new node is to be inserted into the list, a mechanism is generally used to assign the number of forward pointers to the node in a substantially random fashion. The number of extra forward pointers associated with each node is referred to as the node level.

Figure 6:
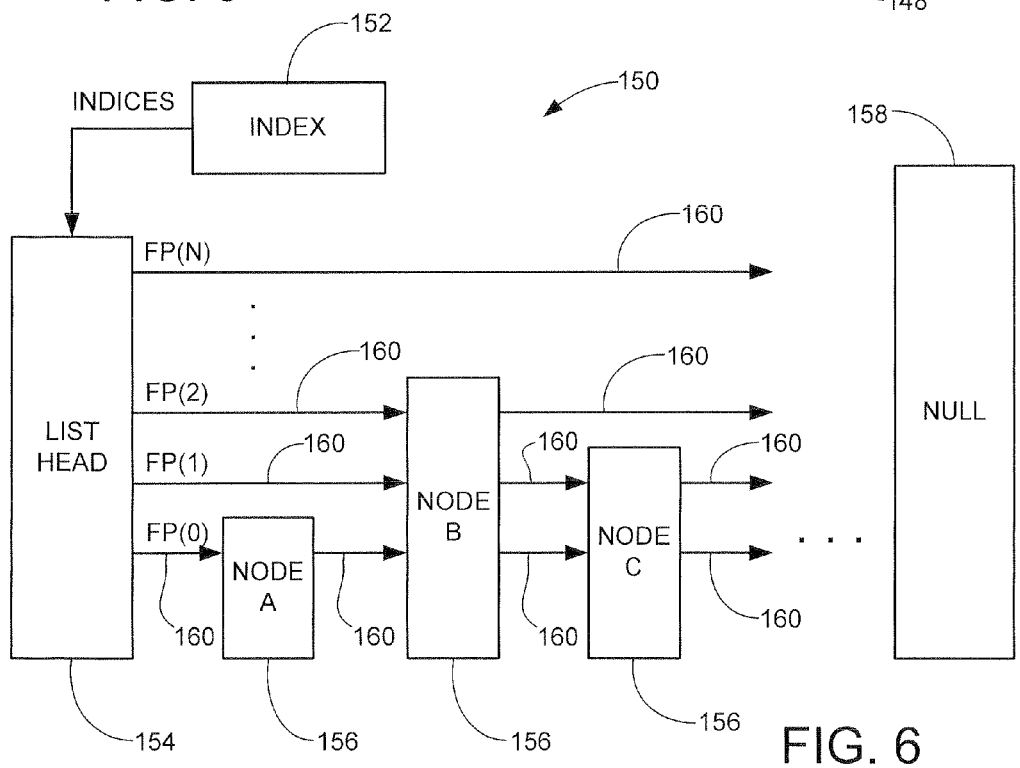
FIG. 6 depicts a generalized skip list format.

A generalized architecture for a skip list is set forth at 150 in FIG. 6, and is shown to include an index input 152, a list head 154, a population of nodes 156 (the first three of which are denoted generally as A, B, C), and a null pointer block 158. Forward pointers (FP) from 0 to N are generally represented by lines 160. The index 152 is supplied from the MLM 134, as noted above.

Each node 156 is a value (offset) accessed by an individual key for that node. The number of forward pointers 160 associated with each node 156 is assigned in a substantially random fashion upon insertion into the list 150. The number of extra forward pointers for each node is referred to as the node level for that node.

Preferably, the number of forward pointers 160 is selected in relation to the size of the list. Table 2 shows a representative distribution of nodes at each of a number of various node levels where 1 of N nodes have a level greater than or equal to x.

TABLE 2

| Level | 1 Out Of "N" | LZ |
|---|---|---|
| 1 | 4 | 2 |
| 2 | 16 | 4 |
| 3 | 64 | 6 |
| 4 | 256 | 8 |
| 5 | 1024 | 10 |
| 6 | 4,096 | 12 |
| 7 | 16,384 | 14 |
| 8 | 65,536 | 16 |
| 9 | 262,144 | 18 |
| 10 | 1,048,576 | 20 |
| 11 | 4,194,304 | 22 |
| 12 | 16,777,216 | 24 |
| 13 | 67,108,864 | 26 |
| 14 | 268,435,456 | 28 |
| 15 | 1,073,741,824 | 30 |

The values in the LZ (leading zeroes) column generally correspond to the number of index value bits that can address each of the nodes at the associated level (e.g., 2 bits can address the 4 nodes in Level 1, 4 bits can address the 16 nodes in Level 2, and so on). It can be seen that Table 2 provides a maximum pool of 1,073,741,824 (0x40000000) potential nodes using a 30-bit index.

From Table 2 it can be seen that, generally, 1 out of 4 nodes will have a level greater than "0"; that is, 25% of the total population of nodes will have one or more extra forward pointers. Conversely, 3 out of 4 nodes (75%) will generally have a level of "0" (no extra forward pointers). Similarly, 3 out of 16 nodes will generally have a level of "1", 3 out 64 nodes will have a level of "2", and so on.

If the list is very large and the maximum number of pointers is bounded, searching the list will generally require an average of about n/2 comparisons at the maximum level, where n is the number of nodes at that level. For example, if the number of nodes is limited to 16,384 and the maximum level is 5, then on average there will be 16 nodes at level 5 (1 out of 1024). Every search will thus generally require, on average, 8 comparisons before dropping to comparisons at level 4, with an average of 2 comparisons at levels 4 through 0.

Searching the skip list 150 generally involves using the list head 154, which identifies the forward pointers 160 up to the maximum level supported. A special value can be used as the null pointer 158, which is interpreted as pointing beyond the end of the list. Deriving the level from index means that a null pointer value of "0" will cause the list to be slightly imbalanced. This is because an index of "0" would otherwise reference a particular node at the maximum level.

It is contemplated that the total number of nodes will be preferably selected to be less than half of the largest power of 2 that can be expressed by the number of bits in the index field. This advantageously allows the null pointer to be expressed by any value with the highest bit set. For example, using 16 bits to store the index and a maximum of 32,768 nodes (index range is 0x0000-0x7FFF), then any value between 0x8000 and 0xFFFF can be used as the null pointer.

Figure 7:
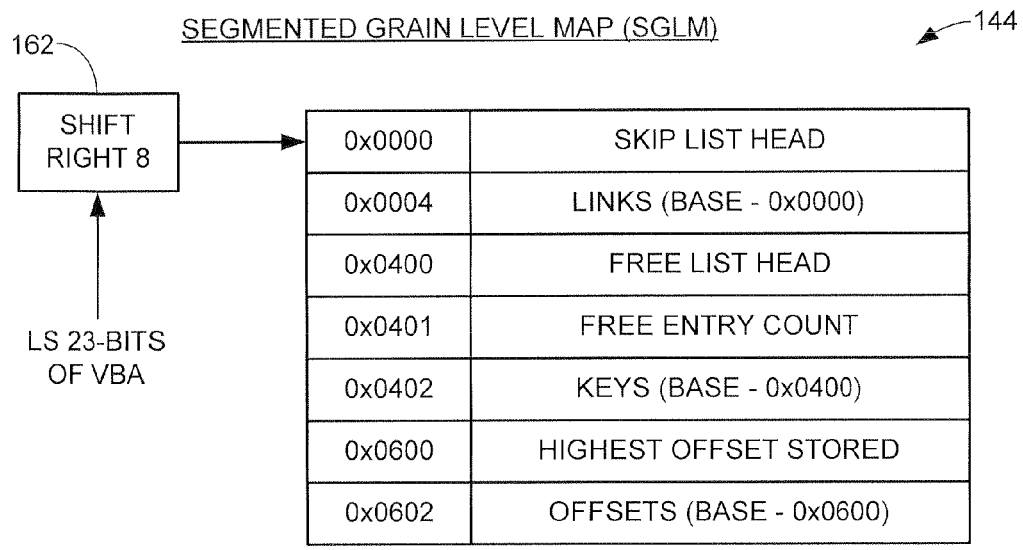
FIG. 7 illustrates a segmented grain level map (SGLM) arranged as a skip list in accordance with FIG. 6.

A preferred memory structure for the SGLM 144 is set forth in FIG. 7. The SGLM 144 in FIG. 7 is a four level skip list with address derived levels and 1-byte pointers. The SGLM 144 is configured to hold up to 255 Key/Offset pairs.

The keys are preferably derived by taking the low order (least significant) 23 bits from the original 32-bit VBA input value (see FIG. 4) and right shifting by 8 bits, as indicated by shift block 162. It will be noted that the key space preferably covers 8 GB so that all keys in the 4 GB grain are unique. The offset determined from FIG. 7 includes a 16 bit (2-byte) pointer that points to a particular RSUD in the virtual space of the first portion 140 of the MLM 134.

Figure 5:
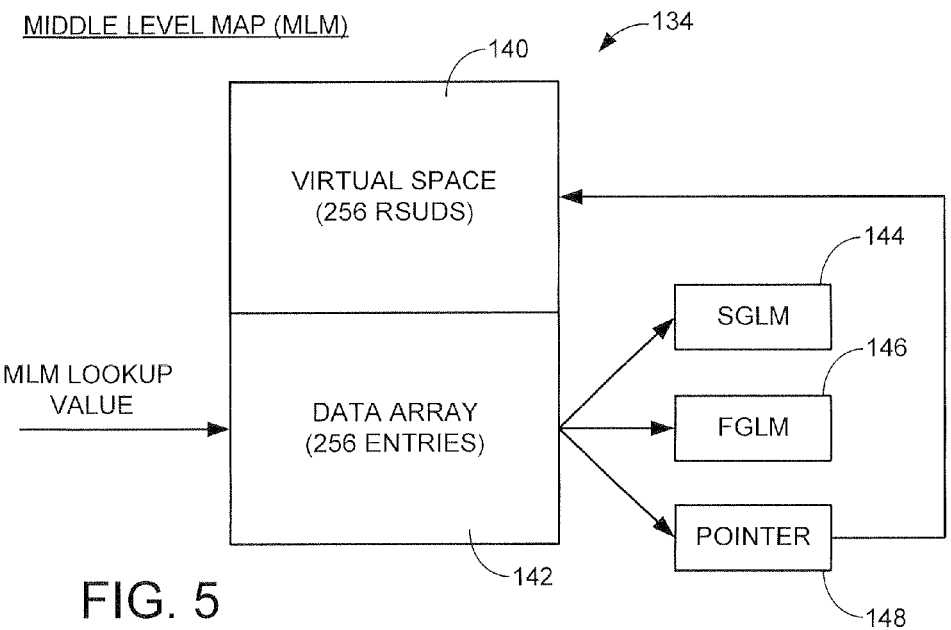
FIG. 5 shows the MLM of FIG. 3 in greater detail.

Multiple entries in the data array 142 of the MLM 134 (FIG. 5) can point to the same SGLM 144. Indeed, all but one entry in the MLM (i.e., 255 out of 256) could reference a single SGLM. The SGLM 144 is particularly useful for storing information for sparsely allocated (i.e., relatively widely separated) non-adjacent values.

A template is preferably used to initialize a new SGLM structure. A new SGLM is created by copying the template over to a new segment of memory. The highest offset stored within a given SGLM 144 will be used to simplify finding the next free 128 KB grain within the given MLM. Preferably, only 3 total cache lines are referenced when searching at levels 2 and 3. It is assumed that adding a new 128 KB grain (new snapshot copy generated) will update not only the SGLM but might also result in an updating or creating of an MLM 134, which in turn may result in an updating of the TLM 132 as well.

Figure 8:
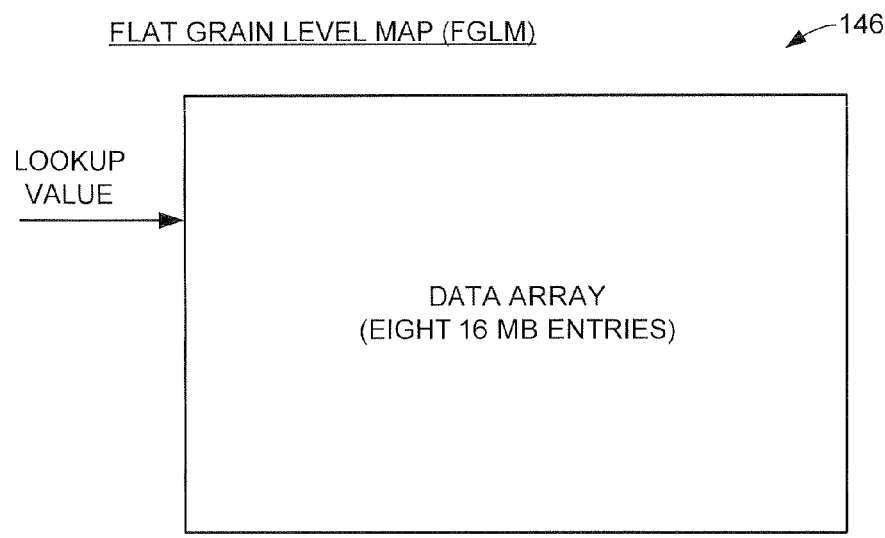
FIG. 8 illustrates a flat grain level map (FGLM) as a direct lookup data array.

A selected FGLM 146 is generally depicted in FIG. 8. As noted above, each FGLM is a data array covering eight 16 MB consecutive entries in a 128 MB space. The entry identified in the data array 142 of the MLM 134 (FIG. 5) is used as a direct lookup to output a pointer value from the FGLM 146 (FIG. 8). As before, the pointer value output by the FGLM 146 points to a particular RSUD entry in the virtual space 140 of the MLM 134, as well as to a particular 128 KB grain within the 16 MB span of the particular RSUD entry.

Ignoring for a moment any overhead associated with the MLM itself, it is contemplated that 64 GB of capacity can be mapped with 1 MB of FGLM structures and 16 GB of capacity can be mapped with 1 MB of SGLM structures. Each MLM 134 can point to up to 256 SGLMs 144, up to 32 FGLMs 146, and up to 256 IRPs (i.e., pointers to the virtual space 140).

Assuming that 25% of the overall storage capacity is original and flat mapped, then 192 MB of data structures could be used to map at a 128 KB copy grain. If 100% of this mapping used SGLM structures, this would map up to 3 TB of capacity, whereas if 100% of this mapping used FGLM structures, this would map up to 12 TB of capacity. It is contemplated that a mixture of these structures would be used in most cases; that is, at least one entry in the MLM data array will point to an SGLM 144, at least one entry will point to an FGLM 146, and at least one entry will point to an RSUD in the virtual space 140.

It is contemplated that the various TLM, MLM and GLM structures can be utilized in a background operational mode to efficiently track snapshot data at a relatively smaller grain size, such as 128 KB, in any number of environments including RAID-5 or RAID-6. Generally, it is contemplated that in response to a data I/O operation in which a particular portion of data are written to the ISE storage space, a portion of this processing will be to determine whether a snapshot copy already exists for this particular portion of data. If so, there is no reason to create a new one.

Accordingly, an associated VBA of that particular portion associated with the I/O operation is supplied to the appropriate TLM structure (FIG. 4). This input provides an associated MLM lookup value which then indexes the data array (bottom portion 142, FIG. 5) of the appropriate MLM 134. As noted above, the output entry will point to a particular entry in the MLM virtual space (upper portion 140, FIG. 5), to a skip list SGLM 144 (FIG. 7), or a second flat data array FGLM 146 (FIG. 8).

In the first case, if the particular entry in the MLM virtual space is a valid RSUD, then this RSUD identifies the location of that snapshot copy. Similarly, in the second and third cases, a successful search of the associated SGLM or FGLM will also produce a pointer to an entry in the MLM virtual space which, if storing a valid RSUD, also identifies the location of the snapshot copy.

On the other hand, if the pointer to the virtual space provides a null value, or the SGLM/FGLM searches come up empty, it can be concluded that no snapshot copy does in fact exist for the associated data. Accordingly, the appropriate space is allocated, the snapshot copy is created and placed in an appropriate memory location (such as the cache memory 126, FIG. 2), a new RSUD is added to the MLM virtual space (upper portion 140), and a corresponding set of pointers is arranged in the MLM data array (lower portion 142). Entries are further added to an SGLM or a FGLM as appropriate.

Initially, it is contemplated that the MLM 140 will be empty (apart from a null value indicating "next offset") and all entries in the MLM data array will point to the null value. As the snapshots are accumulated, associated values will be placed into one or more SGLMs (if sparsely located) or FGLMs (if adjacent). New SGLMs can be generated by the aforementioned template process, and SGLMs can be converted to FGLMs as the node count increases. Eventually, it is contemplated that the entire MLM virtual space could be filled with 256 entries, and the data will be striped to media.

One benefit of a highly efficient small allocation and copy grain as set forth herein is that snapshot data can be written sequentially. A limitation, however, is that the copy grain may require the writing of data where the VBA does not align with its expected position in the virtual space of an RSU. This expected position is, in fact, the offset referred to above. More specifically, the offset is relative to the start of a 4 GB grain and represents an index into an array of 128 KB segments. In terms of a particular RSU, the offset can be reduced to 1 byte (or even 7 bits) to indicate which of 128 RAID stripes (16 MB RSU) in the RSU is being referenced.

As noted above, it is preferred to avoid writing the final stripe until a complete stripes' worth of data have been accumulated. This can generally be handled without issue apart from the potential for shutdown conditions before a full stripe of data have been accumulated. One solution to a power down situation is to simply copy enough such data to fill out the stripe. A downside to this approach is that other status information may indicate (at the 128 KB grain) that some data sets were updated in the parent when this is not in fact the case. This is not likely a major issue, since at larger grain sizes it is not always possible to tell what data have or have not been written either.

While the various foregoing illustrative embodiments have been directed to the use of the data structure in the environment of using small grain snapshot copies in a data storage environment, it will be readily apparent that such is not limiting. Rather, any number of different types of data can be processed using the various TLM, MLM and GLM structures embodied herein, including without limitation general data queries, search engines for Internet web resources, etc.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus that in response to a pending input/output (I/O) operation queries a storage space for an existence of a selected copy grain of a predefined size containing previously stored data corresponding to the I/O operation, comprising a data structure stored in a computer readable memory having first and second portions, the first portion virtually mapping at least some of a predefined portion of the storage space in terms of a plurality of non-sequential entries indexing storage units that each include a plurality of copy grains, and the second portion having a plurality of entries that are indexed in relation to a value derived from an address associated with the I/O operation to locate the selected copy grain in the first portion, at least one entry of the second portion pointing to a skip list and, at least one other entry of the second portion pointing to a flat map data array, the skip list and the flap map data array each operably defining a pointer identifying a selected one of the non-sequential entries of the first portion and an offset value identifying the selected copy grain of the storage unit associated with the selected one of the non-sequential entries, and at least one other entry of the second portion operably pointing to a selected one of the non-sequential entries of the first portion directly.

2. The apparatus of claim 1, wherein a key for the skip list is derived from said second portion entry, and an associated node of the skip list points to the selected one of the non-sequential entries of the first portion.

3. The apparatus of claim 1, wherein the second portion entry provides a direct lookup index into the flat map data array, and an associated value at the direct lookup index points to the selected one of the non-sequential entries of the first portion.

4. The apparatus of claim 1, wherein the first portion and the second portion each accommodate a same maximum number of entries.

5. The apparatus of claim 1, wherein each of the non-sequential entries of the first portion comprises a reliable storage unit descriptor (RSUD) which identifies a unique address for a selected range of data in the respective storage unit.

6. The apparatus of claim 5, wherein the existence of an RSUD in the first portion indicates that a snapshot copy exists before performing the I/O operation.

7. The apparatus of claim 1, wherein the data structure is characterized as a middle level map (MLM), and wherein the entries of the second portion are indexed by providing an input value associated with the I/O operation to a top level map (TLM).

8. The apparatus of claim 1, wherein the storage space forms a portion of a storage element comprising an array of data storage drives.

9. The apparatus of claim 1, wherein the non-sequential entries of the first portion identify associated ranges of storage space addresses of the respective storage units.

10. A method of querying data in a storage space, comprising:
storing a data structure having first and second portions in a computer readable memory, the first portion virtually mapping at least some of a predefined portion of the storage space in terms of a plurality of non-sequential entries indexing storage units that each include a plurality of copy grains, and the second portion storing a plurality of entries that are indexed to locate a desired copy grain in the first portion, wherein at least one second portion entry points to a skip list, at least one second portion entry points to a flat map data array, and at least one second portion entry points to a selected non-sequential entry in the first portion;
receiving a request to perform a pending input/output (I/O) operation; and
in response to the receiving step, indexing the second portion in relation to a value derived from an address associated with the pending I/O operation to portion point to at least one of the skip list and the flat map data array;
deriving an offset value from the skip list and the flat map data array; and
using the at least one of the skip list and the flat map data array to identify the selected copy grain associated with the selected one of the non-sequential entries.

11. The method of claim 10, wherein the indexing step comprises deriving a key for the skip list from said second portion entry, searching the skip list using the key to identify a corresponding node, and using a value at said node to point to a selected one of the non-sequential entries of the first portion.

12. The method of claim 10, wherein the indexing step comprises indexing the flat map data array using the second portion entry to output a pointer value, and using the pointer value to identify a corresponding one of the non-sequential entries of the first portion.

13. The apparatus of claim 10, wherein each of the non-sequential entries of the first portion comprises a reliable storage unit descriptor (RSUD) which identifies a unique address for a selected range of data in the respective storage unit, and the existence of an RSUD in the first portion indicates that a snapshot copy exists before performing the pending I/O operation.

14. The method of claim 10, wherein the storage space is characterized by forming a storage element from an array of a plurality of data storage drives.

* * * * *